United States Patent
Farley

[11] Patent Number: 6,016,977
[45] Date of Patent: Jan. 25, 2000

[54] HAND HELD SHOWER HEAD AND FILTER HOUSING

[76] Inventor: David K. Farley, 1827 Capital St., Corona, Calif. 91720

[21] Appl. No.: 09/123,967

[22] Filed: Jul. 29, 1998

[51] Int. Cl.[7] ................................ B05B 1/14; B05B 7/02
[52] U.S. Cl. ........................................ 239/553.3; 239/525
[58] Field of Search .................................. 239/553.3, 462, 239/548, 553, 556, 525, 530; 210/264, 266

[56] References Cited

U.S. PATENT DOCUMENTS

| | | | |
|---|---|---|---|
| 539,301 | 5/1895 | Prentiss | 239/548 |
| 1,774,004 | 9/1930 | Haslett . | |
| 3,083,916 | 4/1963 | Neel . | |
| 3,746,174 | 7/1973 | Watanabe . | |
| 4,025,438 | 5/1977 | Gelman et al. | 210/484 |
| 4,172,796 | 10/1979 | Corder . | |
| 4,504,389 | 3/1985 | Rundzaitis . | |
| 4,732,674 | 3/1988 | Tamura et al. . | |
| 5,008,011 | 4/1991 | Underwood | 210/232 |
| 5,152,464 | 10/1992 | Farley | 239/553.3 |
| 5,407,573 | 4/1995 | Hughes | 210/266 |
| 5,427,683 | 6/1995 | Gershon et al. | 210/264 |
| 5,549,822 | 8/1996 | Ferguson | 210/238 |
| 5,772,119 | 6/1998 | Someya et al. | 239/553.3 |
| 5,837,136 | 11/1998 | Lee | 210/264 |

FOREIGN PATENT DOCUMENTS

4341196-A1  6/1994  Germany ................................ 239/553

*Primary Examiner*—Andres Kashnikow
*Assistant Examiner*—Davis Hwu
*Attorney, Agent, or Firm*—James G. O'Neill

[57] ABSTRACT

A hand held shower head and filter assembly for attachment to a waterline to remove chlorine and other substances from water. This assembly includes a reversible and reusable filter assembly for use with hot water passing through a two stage bed of ceramic-type calcium sulfite beads and a copper/zinc material. The device includes an elongated, hollow handle which holds the filter element therein in such a manner that the filter media reacts with or removes chlorine and other substances more efficiently from shower water, thereby allowing a greater volume of water to be treated, as well as the treatment of water at elevated temperatures, in a more versatile and useful device.

19 Claims, 1 Drawing Sheet

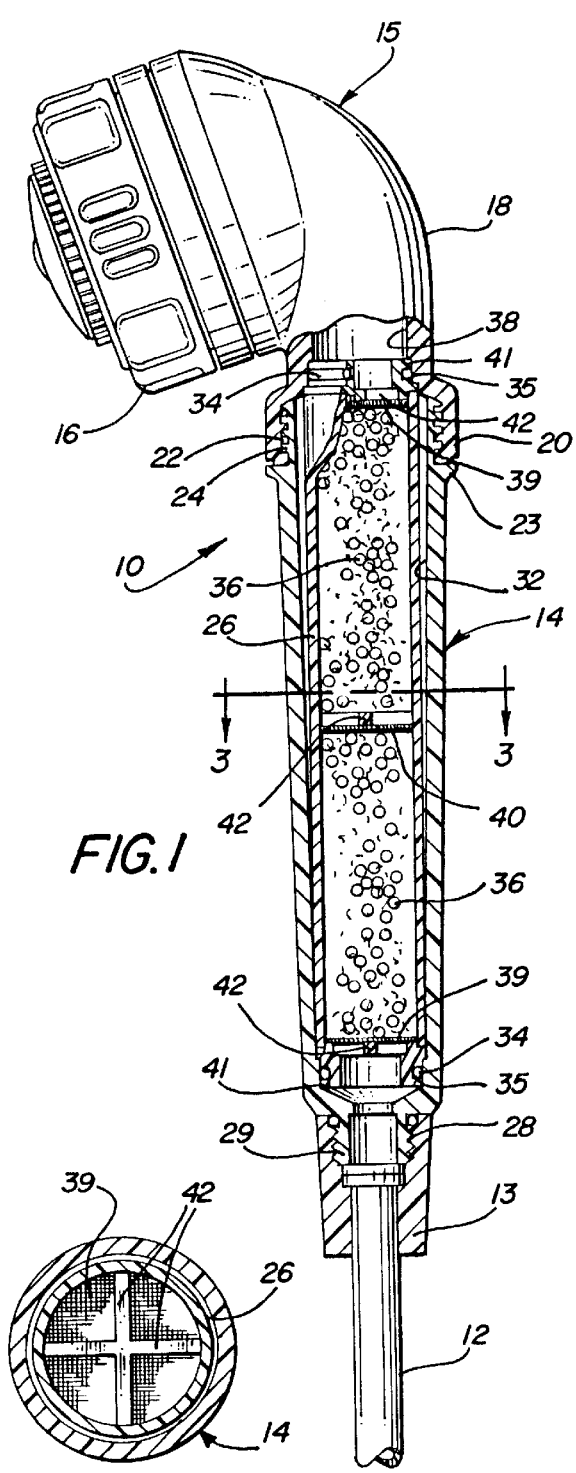
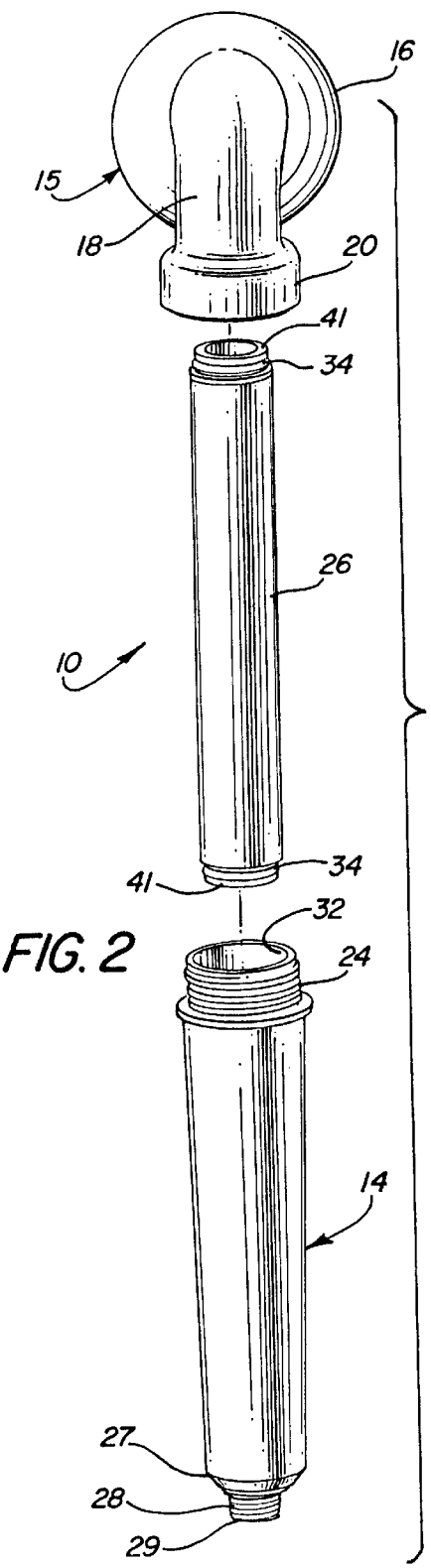
FIG. 1
FIG. 2
FIG. 3

HAND HELD SHOWER HEAD AND FILTER HOUSING

BACKGROUND OF THE INVENTION

1. Field of the Invention

This invention relates generally to devices for treating fluids and, more particularly, to a combination hand held shower head and filter housing for the removal of unwanted contaminants, such as chlorine, from water.

2. Description of Related Art

Starting after the U.S. Civil War, the recognition and linking of macroscopic and microscopic pathogens to the aesthetic and health qualities of water resulted in the search for effective water disinfection and treatment procedures. Soon thereafter, chlorine was identified as a disinfecting agent. Towards the end of the 19th century, there were several recorded instances of the use of chlorine compounds for the disinfection of water and, with increasing experience, the effectiveness of chlorine treatment of water became more widely recognized and appreciated. The introduction of water chlorination, as a continuous process, occurred soon after the turn of the century. Currently, approximately 80% of all potable water systems in the U.S. contain chlorine as a disinfectant.

Different devices and methods for dechlorination of water have been used both at the point-of-entry ("POE") into a commercial, industrial or residential building, and the point-of-use ("POU") at the faucet, shower head or tap.

POE systems typically are in the form of an aerator, or a large organic or inorganic filtering media bed. Although applicable in some instances, these systems have potential problems, and have fallen under close scrutiny, due to the possibility of pathogenic reintroduction back into the water system, after the point of dechlorination. Because of this possibility, and recent advancements in water treatment technology, POU water treatment systems have become widely accepted and are now primarily used in residential, and to a large degree, in commercial and industrial applications.

Both organic and inorganic filtering media are known for use in dechlorination. Carbon (organic) filtering media are used either alone, or in conjunction with other systems, such as reverse osmosis or distillation, or may be used with inorganic filtering media, such as cation/anion resins.

Currently, shower filters are known which use various types of materials to filter out impurities in water. However, the performance of such shower filters is restricted by the water's high flow rate and the high temperatures of the water. Traditional filtration methods have historically relied on carbon as the filtration media, using the process of adsorption to remove contaminants such as chlorine. The mechanics of adsorption involve a finite number of molecular attachment sites located in each granule of activated carbon. Often compared to a sponge, carbon "pulls" contaminants out of the water by an electrochemical charge located at each site. Used for removing the free and combined (or total) chlorine from drinking water at typically lower flow rates and at room temperature (25 degrees C.), carbon is quite effective.

However, carbon's shower water filtration efficiency is limited by the higher flow rate and high temperatures of shower water. In fact, carbon has a tendency to release previously adsorbed contaminants back into the water stream when temperatures approach the contaminants' boiling or vaporization point. Chlorine has a relatively low vaporization point. The releasing (off-loading) of chlorine begins when the water temperature is at about 90 degrees.

A partial solution to filtration of shower water at high temperatures and flow rates came with the use of granular copper and zinc. This media utilizes different filtration mechanics. Instead of pulling contaminants out of the water through the process of adsorption, as the carbon does, the copper and zinc (being very dissimilar metals) create an increased electro-negative potential in the water. Free chlorine is converted to an FDA "food grade" safe substance, zinc-chloride. This process is rather selective. Even though the free chlorine is converted, the many molecular combinations of chlorine (combined chlorine) are not affected, and remain in the water.

It is the free (uncombined) chlorine that is introduced into the water for disinfection purposes. It easily passes through the cell wall of the pathogen and attaches to the fatty acids in the cell creating complex chloro-compound. Once this occurs, cell functions cease and pathogen dies. The same processes occur when the human body is exposed to chlorine. Symptoms of chlorine exposure ranges from dry, itchy-flaking skin, scalp and hair to epidermal rash, and even to colon, liver and bladder cancer. Effective as copper-zinc filtration is, it also has its limits. In the case of chlorine, it is chlorine-free specific. That is to say that it only affects the free chlorine and not the combined chlorine. Copper-zinc has two main problems: 1) it cannot convert the multitude of combined chlorines; 2) it requires a temperature environment of over 90 degrees (F.) to effectively convert the free chlorine.

Another type of prior art filter media is disclosed in U.S. Pat. Nos. 4,642,192 and 5,122,274, which disclose an "electronegative cell potential type" chlorine filter media. The preferred media to filter out chlorine disclosed in these patents is brass (a mixture of copper and zinc).

Two types of shower filters devices are disclosed in U.S. Pat. Nos. 5,152,464 and 5,300,224 to Fredrick A. Farley. The devices disclosed in these patents are compact filter assemblies containing a filtering media, such as copper and zinc, to filter out unwanted chlorine in water passing through the filters.

U.S. Pat. No. 2,582,388, discloses another prior art water filter, for insertion into a waterline, having two parts threaded together to form a shell or housing, with a plurality of screens held in an inlet to and an outlet from the interior thereof. Layers of activated charcoal, separated by a layer of silica and screens are arranged in the shell to filter water passing therethrough.

U.S. Pat. No. 3,760,951, incorporates U.S. Pat. No. 2,582,388 therein by reference, and discloses a similar water filter for insertion into a waterline by means of quick-disconnect bayonet fittings that allow the filter to be easily removed for cleaning or replacement.

U.S. Pat. No. 3,780,869, discloses a water filter, for insertion into a waterline, having a plurality of compartments with multiple filtering elements of sheep's wool therein.

U.S. Pat. No. 3,822,018, discloses a water filter, for insertion into a waterline, having two hemispherical sections joined together by threaded portions. The filter has a plurality of cylindrical filter elements annularly arranged therein containing natural wool, charcoal, cork and the like, and includes a valve for directing water through the filter elements or for directing water through the device, unfiltered.

U.S. Pat. No. 4,107,046, discloses a filter cartridge for an internally by-passable water purifier apparatus. The apparatus includes valve means for directing water through the filter cartridge, which contains granulated carbon mixed with a silver zeolite, and may be sandwiched between fibrous sheets of material, such as felt, before it exits the apparatus.

U.S. Pat. No. 4,172,796, discloses a water faucet having a water purification or filtering means, made from activated carbon, or carbon with oligodynamic silver, formed therein.

U.S. Pat. No. 4,504,389, discloses a water faucet having a separate housing containing a removable cartridge or filter element made from various stages of polyethylene and activated carbon particles therein.

U.S. Pat. No. 5,008,011, discloses a shower dechlorinator fabricated in the form of a short cylindrical filter housing having two separate end caps with inlet and outlet means for attachment between the outlet pipe for a shower and a shower head. The filter housing is filled with granulated or randomly oriented fibrous material in the form of a copper-zinc metal alloy.

While the foregoing prior art devices, filter media and methods provide improved filtration of water passing through them, the devices are not adapted to be hand held, nor does the media always meet the more stringent health and safety standards of today. Furthermore, while the above-mentioned prior art provide some limited improvements in the filtering art, there remains the need in the art for a hand held device that provides the most efficient filtering out of unwanted materials from water, such as chlorine during bathing and showering, while at the same time providing the versatility of a hand held unit that may be conveniently used in a shower stall or bath tub.

SUMMARY OF THE INVENTION

Accordingly, it is a general object of the present invention to provide an improved shower water filter. It is a particular object of the present invention to provide an improved hand held device for filtering contaminants from water. It is a still more particular object of the present invention to provide an improved combination hand held shower head and filter for filtering contaminants from hot water passing therethrough at high flow rates. It is yet a more particular object of the present invention to provide an improved hand held shower head and water filter using non-soluble calcium sulfite. It is a further object of the present invention to provide a hand held shower head and filter that meets the demanding filtering capacity and temperature requirements of modern water supplies having higher concentrations of toxins therein, and which is versatile in use.

In accordance with one aspect of the present invention, there is provided a hand held shower head and filter having an elongated filter element held in an elongated, hollow handle. The filter element may have a filter media, such as non-soluble calcium sulfite, alone or combined with a copper-zinc medium therein, to allow for the improved treatment of hot shower water, at high flow rates, in a versatile, portable unit.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the accompanying drawings, in which:

FIG. 1 is a perspective view, partially in cross-section, of the preferred embodiment of a hand held shower head and filter assembly of the present invention;

FIG. 2 is an exploded view of the assembly of FIG. 1; and

FIG. 3 is a cross-sectional view taken along line 3—3 of FIG. 1.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an explanation of a novel filter assembly for use in filtering toxic substances, such as chlorine, from fluids, such as hot water, passing through the assembly of the present invention.

Turning now to the drawings, there shown is a filter assembly 10, which is secured in or to one end of a flexible fluid conduit 12, as by means of a threaded fastener 13. The other end of the conduit 12 is secured to a faucet or shower arm in a known manner, to carry water to the assembly 10. The assembly 10 includes an elongated, hollow, one piece or unitary main body or shell 14, which may be constructed in any conventional or known manner from any acceptable material, such as a high strength plastic or the like. The elongated, hollow, one piece main body or shell 14 forms a handle portion for grasping or holding the assembly 10. An upper portion 15, having an angled shower head 16 is secured at a first or upper end 23 of body 14, as by means of a curved conduit or element 18. Curved element 18 includes an enlarged, annular end 20 having threads 22 formed internally therein. Threads 22 are adapted to mate with external threads 24 formed on the first or upper end 23, above a flange extending around the body 14. When secured together, as by twisting the threaded portions 22 and 24 together, body 14 and upper portion 15 form an assembly 10 capable of containing high pressure fluids, as well as, a removable and reversible filter element 26 within a chamber 32 formed in the hollow handle 14, as described more fully below.

The elongated body 14 is preferably formed as a tapering, cylindrical element, with its first or upper end 23 being larger than a second or lower end 27. Lower end 27 includes external threads 28 formed on a smaller diameter extension 29. That is, the end 27 is of a smaller diameter than the first end 23. This elongated, tapered body 14 forms the handle of the assembly of the present invention, and includes a fluid inlet 30 formed in extension 29 on which fastener 13 is secured. The inlet 30 is connected to the inner chamber 32, formed in the body 14. Since 20 the lower end 27 of the body 14 is smaller in diameter, the lower end of the elongated, inner chamber 32 is also smaller in diameter than the top portion thereof adjacent larger end 23. Sealing members 34, captured in a pair of grooves 35 formed at both ends of the elongated filter element 26 are sealingly captured within the inner chamber 32 and an internal passage 38 formed in curved 18, above the internal threads in the enlarged annular end 20, to seal the filter element in the assembly 10. Fluid entering from inlet will, therefore, flow into the interior of filter 26, so as to pass through a filtering media 36 held within the filter 26, as described more fully below. The sealing members 34 on either end of the filter element 26 will be sealingly secured in either interior chamber 32 or internal passage 38, as shown in FIG. 1. That is, when the upper portion 15 is secured to the body 14, the sealing element 34, held at the upper end of filter element 26, is forced into contact with passage 38, and the sealing member 34 at the lower end of filter 26 will be forced into contact with the narrower, smaller diameter end of inner chamber 32.

In use, when water comes from conduit 12 into inlet 30, the water will pass through the filter media 36 in filter 26 to the outlet or passage 38 in the curved element 18 of the upper portion 15, before exiting through shower head 16. The fluid first flows through a screen 39, held in an end cap 41, secured in the lower end of filter element 26, as by means of crossed arms or braces 42, through the filter media 36 in a first stage, then through a center or inner screen 40, held in place by a further set of braces 42, and then through filter media 36 in a second stage. After passing through the filter media in the second stage, the water passes through a screen 39, held in end cap 41, secured in the upper end of filter 26, before it passes through passage 38 and out through the shower head 16.

Screens 39 and end caps 41 at both ends of the filter 26 may be permanently or removably secured within the ends of the filter element 26, to retain the filter media 36 in place in the first and second stages. If the end caps are removable, further filter media 36 may be added to either or both stages in filter 26.

The dechlorination or filtering media 36 held within the filter element 26 may consist of any commercially available filter media, but is preferably "ceramic-type calcium sulfite beads", or particles, used alone or mixed with a copper/zinc material. The ceramic-type calcium sulfite beads are made by combining powdered calcium sulfite with ceramic binders, such as, but not limited to polyvinyl alcohol (PVA), polyethylene glycol (PEG) and polyacrylics. The ceramic-type calcium sulfite beads of the present invention are manufactured by using low temperature, insoluble ceramic binders. Unlike other forms of calcium sulfite agglomerates (particles), ceramic-type calcium sulfite beads are highly insensitive to re-hydration when immersed in water over long periods of time. Since the ceramic binder is insoluble, when combined with powdered calcium sulfite, the ceramic-type calcium sulfite agglomerate is insoluble. The importance of insolubility becomes evident when considering the higher temperatures, flow rates and volume of water associated with shower filtration. Particle integrity determines overall filtration performance.

Calcium sulfite and ceramic binders (preferably acrylic) can be mixed together using a variety of agglomeration (particle forming) processes. Currently, the ceramic-type beads of the present invention are formed in a disk pelletizer. Calcium sulfite is first milled to a fine powder and then tumbled in the disk pelletizer. Liquid acrylic ceramic binder is sprayed onto the powder through a spray bar causing the particles to adhere to each other. As the powder is tumbled, a "snowball effect" begins. The sprayed powder forms larger particles. Once the correct bead or particle size has been achieved, the moist particles are ready to be dried (dehydrated).

The drying process creates the ceramic-type beads or particles. When initially applied, the liquid ceramic binder is a copolymer chain. Dehydration transforms (unzips) the two-dimensional copolymer chain into a three dimensional ceramic polymer matrix. The integrity of the matrix depends on the extent of dehydration. The presence of a hydrated copolymer chain link within the partially dehydrated polymer matrix, impedes matrix bonding, significantly reducing the structural integrity of the matrix. The strength of the matrix is referred to as the "green strength" of the ceramic-type calcium sulfite beads. The green strength of the beads increases as they are dehydrated. Dehydration can be achieved by slowly airing at room temperature or placing the beads in a form, or the like, in an oven and firing (heating) to 400° C. The firing of the beads results in the greatest degree of particle dehydration. Dehydration of the ceramic-type calcium sulfite beads, surprisingly requires lower temperatures than the 1000° C. normally required by Legonosulfonates commonly used in the ceramic, refractory and brick industry.

The ceramic-type calcium sulfite beads of the present invention when formed have a hard exterior surface, but are still sufficiently porous that they may be used in a shower filter. Shower filters are subject to a greater flow of water at elevated temperatures and pressures, than is the case with drinking water coming from a faucet or tap. Furthermore, using these ceramic-type calcium sulfite beads with an equal mixture of a copper-zinc material, such as KDF, substantially elevates performance of the combined elements and entirely unexpected results are obtained. That is, the combination of the ceramic-type calcium sulfite beads with the copper-zinc material work longer and harder to remove all of the chlorine, not just free chlorine, from the elevated temperature water passing through the shower filter.

The hard exterior shell or surface of the non-soluble, ceramic-type calcium sulfite beads of the present invention allow the calcium sulfite to dissolve more slowly. Furthermore, as disclosed herein, the specific formulations have been found to optimize the advantages of the calcium sulfite/copper-zinc combination. Additionally, the present invention employs the unique use of and combination of materials herein disclosed in an inventive formulation held in an elongated filter housing that allows the materials used to act synergistically with each other to perform functions not taught or foreseen heretofore.

Specifically, the combination of the ceramic-type calcium sulfite beads and copper zinc herein disclosed, particularly in the specified ratio, greatly improves upon the filtering capabilities of known filter media in a totally unexpected manner. The increased filtering ability of the copper-zinc media by the addition of non-soluble ceramic-type calcium sulfite beads, is a result which was not foreseen or predicted in any prior art.

In the present invention, the use of the ceramic-type calcium sulfite beads in combination with the copper zinc, acts synergistically, not only to filter out contaminants from water, and particularly hot shower water, but also to enhance and expedite the shower filtering process, for a longer period of time, thus greatly increasing the effectiveness of the filtering process in the hand held unit of the present invention.

The ceramic-type calcium sulfite beads, alone or combined with copper-zinc, are held within the two stages of the filter element 26, is preferably in approximately equal volumes (50—50).

It, therefore, can be seen that the device of the present invention provides both a versatile hand held unit, which can handle increased volumes of hot water. Furthermore, the combined filter media held in the easily removable and reversible unit, provides a hand held unit with more complete dechlorination of hot water passing therethrough, for longer periods of time, thus producing savings in the use of energy and materials.

Accordingly, as will be apparent to those skilled in the art, the present invention provides considerable advantages in ease and flexibility of use and for filtering chlorine or other unwanted substances from hot shower water, and particularly, provides a unique assembly having an elongated handle which contains an elongated, reversible filter element for removing chlorine or other substances from hot water during bathing or showering. Specifically, the device herein disclosed provides for more efficiently and safely removing chlorine and other toxic substances from hot water, without any known adverse health risks, in a versatile manner.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A hand held shower assembly, comprising, in combination:
   an elongated, hollow body to be held in a hand, having an elongated internal chamber formed therein between a first end and a second end to allow fluid to flow into and out of the elongated, internal chamber;
   said elongated, hollow body to be held in a hand, being cylindrical with the first end forming an inlet, and the second end forming an outlet;
   an elongated filter element removably mounted in the elongated, internal chamber;
   the first end and the second end having screw threads formed thereon; and
   a shower head secured at an angle to the screw threads formed on the first end, and covering a portion of the elongated filter element.

2. The hand held shower filter assembly of claim 1, further including a curved element formed between the shower head and the screw threads formed on the first end.

3. The hand held shower assembly of claim 2 wherein the elongated filter element has two ends with sealing elements held at the two ends whereby said filter element is sealingly held in a lower end of the internal chamber and an internal passage formed in the curved element.

4. The hand held shower assembly of claim 3 wherein the filter element includes two stages, divided by a screen, and the two stages have filter media therein.

5. The hand held shower assembly of claim 4 wherein the filter media is a mixture of a non-soluble calcium sulfite and a copper-zinc media.

6. The hand held shower assembly of claim 5 wherein the non-soluble calcium sulfite is in the form of beads.

7. The hand held shower assembly of claim 6 wherein the non-soluble calcium sulfite beads and the copper-zinc media are mixed together in approximately equal volumetric portions.

8. The hand held shower assembly of claim 1 wherein the elongated, hollow body and the elongated internal chamber are tapered so as to narrow from the first end to the second end.

9. A hand held shower assembly for removing chlorine from hot shower water, comprising:
   an elongated, hollow body to be held in a hand, having an elongated, internal chamber formed between a first open end and a second open end;
   screw threads formed on an exterior surface of said elongated, hollow body at said first open end and said second open end;
   the elongated, internal chamber being tapered so that the first open end of the elongated, hollow body and a first upper end of the elongated, internal chamber are larger than the second open end and a second lower end of the elongated, internal chamber;
   a separate, upper portion comprised of an angled shower head and a curved conduit secured to the screw threads at the first open end; and
   an elongated filter element sealingly held in the tapered, elongated, internal chamber and extending into an internal passage formed in the curved conduit.

10. The hand held shower assembly of claim 9 wherein the elongated filter assembly has two end caps having sealing elements and screens held therein.

11. The hand held shower assembly of claim 10 wherein the filter element contains two separate stages of filter media divided by a central screen.

12. The hand held shower assembly of claim 11 wherein the two stages of filter media are a non-soluble calcium sulfite and a copper-zinc media.

13. The hand held shower assembly of claim 12 wherein the non-soluble calcium sulfite is in the form of beads.

14. The hand held shower assembly of claim 13 wherein the non-soluble calcium sulfite beads are mixed with a copper-zinc media in approximately equal volumetric portions.

15. A hand held shower head assembly having a body and a shower head, comprising, in combination:
   the body being an elongated, tapered, hollow handle to be held in a hand;
   an elongated, tapered, internal chamber formed in the elongated, tapered, hollow handle to be held in a hand;
   a first, larger end of the elongated, tapered, hollow handle to be held in a hand having external screw threads formed thereon;
   a second, smaller end of the elongated, tapered, hollow handle to be held in a hand having external screw threads formed thereon;
   the shower head comprised of an upper portion which is angled and has a curved, internal conduit having internal screw threads formed in an internal passage; the upper portion being secured to the first, larger end by the internal screw threads and the external screw threads on the first, larger end; and
   an elongated filter element held in the elongated, tapered, internal chamber; the elongated filter element having a pair of end caps and being internally divided into two stages by a central screen; a first of the pair of end caps extending into the internal passage.

16. The hand held shower head assembly of claim 15 wherein the pair of end caps include screens held therein, and sealing elements held thereon and cooperating with said internal passage, and a lower end of the elongated, tapered, internal chamber, to force water flowing into an inlet formed in the second, smaller end of the elongated, tapered, hollow handle to be held in a hand through the elongated filter element and out the shower head.

17. The hand held shower head assembly of claim 16 wherein the filter media is an approximately equal portions of non-soluble calcium sulfite and a copper-zinc media.

18. The hand held shower head assembly of claim 17 wherein the non-soluble calcium sulfite is in the form of beads held together by a ceramic binder.

19. The hand held shower head assembly of claim 15 wherein one of the pair of end caps of the elongated filter element extends into and is sealingly held in the internal passage.

* * * * *